(12) United States Patent
Kamiya et al.

(10) Patent No.: US 6,663,953 B2
(45) Date of Patent: Dec. 16, 2003

(54) FRESNEL LENS BASE SHEET

(75) Inventors: Shunji Kamiya, Inagi (JP); Makoto Honda, Shinjuku-ku (JP); Keiji Hanamoto, Shinjuku-ku (JP)

(73) Assignees: Asahi Kasei Kabushiki Kaisha (JP); Dai Nippon Printing Co., Ltd. (JP)

( * ) Notice: Subject to any disclaimer, the term of this patent is extended or adjusted under 35 U.S.C. 154(b) by 0 days.

(21) Appl. No.: 10/074,223

(22) Filed: Feb. 14, 2002

(65) Prior Publication Data

US 2002/0156197 A1 Oct. 24, 2002

(30) Foreign Application Priority Data

Feb. 19, 2001 (JP) .................................. 2001-041434

(51) Int. Cl.$^7$ .................. C08L 51/04; C08L 25/14; G02B 3/08
(52) U.S. Cl. .................. 428/327; 428/522; 525/84; 525/85; 525/309; 525/310; 359/742; 359/819
(58) Field of Search ................ 525/84, 85, 309, 525/310; 428/327, 522; 359/742, 819

(56) References Cited

U.S. PATENT DOCUMENTS

| | | | |
|---|---|---|---|
| 4,097,555 A | | 6/1978 | Moran |
| 5,476,906 A | * | 12/1995 | Yokoo |
| 5,891,962 A | * | 4/1999 | Otsuzuki |
| 5,969,867 A | * | 10/1999 | Fukushima |
| 6,121,385 A | | 9/2000 | Shichijo et al. |

FOREIGN PATENT DOCUMENTS

| | | | |
|---|---|---|---|
| EP | 0 570 133 | | 4/1993 |
| EP | 0 703 252 | | 3/1995 |
| JP | 11-147993 | * | 6/1999 |

OTHER PUBLICATIONS

Patent Abstracts of Japan 2000147664 May 2000.

* cited by examiner

*Primary Examiner*—David J. Buttner
(74) *Attorney, Agent, or Firm*—Parkhurst & Wendel, L.L.P.

(57) ABSTRACT

A Fresnel lens base sheet is provided which is suitable for the formation of a lens layer of an ultraviolet-cured resin and has excellent impact resistance and environmental resistance. The Fresnel lens base sheet comprises a specific rubber-modified styrene resin comprising a rubber-like elastic material as dispersed particles and a copolymer of a styrene monomer with an acrylic (methacrylic) ester monomer as a continuous phase.

3 Claims, No Drawings

FRESNEL LENS BASE SHEET

TECHNICAL FIELD

The present invention relates to a Fresnel lens base sheet which can be used as screens of projection televisions, microfilm readers or the like, can be used as transmission screens, possesses excellent impact resistance and environmental resistance, and is suitable for the formation of a lens layer of an ultraviolet-cured resin.

BACKGROUND ART

Projection screens such as transmission screens are extensively used for projecting television images, microfilm images or the like to realize contemplated displays. This type of projection screen generally comprises a combination of lens sheets such as lenticular lens sheets and Fresnel lens sheets. By virtue of this construction, when a viewer observes the screen, the screen is bright and the angle of visibility is increased.

Light transparent materials used in these lens sheets include methacrylic resins or styrene resins possessing excellent transparency, lightfastness, scratch resistance and the like and, at the same time, excellent moldability. Lens sheets have been molded, for example, by press molding, extrusion, cast molding, or injection molding. In recent years, however, from the viewpoint of high productivity, a method has become adopted wherein a lens layer of an ultraviolet-cured layer is formed on a light transparent sheet.

Methacrylic resins used as a substrate for this lens sheet have a relatively high water absorption. For example, in the case of a methacrylic resin having an initial length of 1000 mm, when the relative humidity is changed from 50% to 90%, or from 90% to 50%, the expansion or contraction level is 1.6 mm. In general, when the water absorption has caused a change in dimension of the lens sheet, the warpage or lift of the screen occurs, disadvantageously resulting in deteriorated optical characteristics or the separation of the lens sheet from a frames On the other hand, in the case of a styrene resin having low water absorption, disadvantageously, the lightfastness is poor, and the lens sheet undergoes a change in color which lowers light transmittance.

Further, both the methacrylic resin and the styrene resin have poor impact resistance, and, consequently, the Fresnel lens sometimes causes breaking, cracking, or the like, for example, during the production thereof or in transit and thus is rejected.

In order to solve these problems, Japanese Patent Laid-Open No. 341101/1993 proposes a method wherein a styrene-diene copolymer is dissolved in a mixture composed of an aromatic vinyl monomer, a (meth)arrylic ester monomer, and a polyfunctional unsaturated monomer, the mixture is polymerized, and a Fresnel lens is prepared from the polymer. Japanese Patent Laid-Open No. 3502/1994 proposes a method wherein a Fresnel lens is prepared using a styrene resin containing a noncrosslinking resin. Japanese Patent Laid-Open No. 147664/2000 proposes a Fresnel lens prepared by casting a monomer mixture containing an (meth)acrylate monomer, a styrene monomer and transparent resin beads. These techniques, however, are unsatisfactory for the formation of a Fresnel lens base sheet which is suitable for the formation of a lens layer of an ultraviolet-cured resin and has excellent impact resistance and environmental resistance.

DISCLOSURE OF THE INVENTION

Accordingly, it is an object of the present invention to provide a Fresnel lens base sheet which is suitable for the formation of a lens layer of an ultraviolet-cured resin and has excellent impact resistance and environmental resistance and can realize excellent image quality.

In order to attain the above object, the present inventors have made extensive and intensive studies and as a result have found that a specific rubber-modified styrene resin comprising a rubber-like elastic material as dispersed particles and a copolymer of a styrene monomer with an acrylic (methacrylic) ester monomer as a continuous phase is suitable for the formation of a lens layer of an ultraviolet-cured resin and can provide a Fresnel lens base sheet having excellent impact resistance and environmental resistance. This has led to the completion of the present invention.

Thus, according to one aspect of the present invention, there is a Fresnel lens base sheet suitable for the formation of a lens layer of an ultraviolet-cured resin, said base sheet being formed of a rubber-modified styrene resin comprising a rubber-like elastic material as dispersed particles and a styrene resin as a continuous phase, (i) the styrene resin constituting the continuous phase being a copolymer of a styrene monomer (A) represented by formula (1)

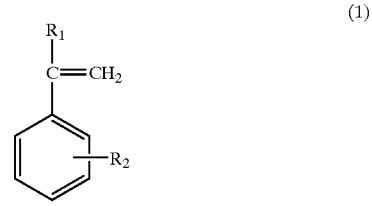

wherein $R_1$ represents hydrogen or a methyl group; and $R_2$ represents hydrogen or an alkyl group having 1 to 5 carbon atoms, with an acrylic (methacrylic) ester monomer (B) represented by formula (2)

wherein $R_3$ represents hydrogen or a methyl group; and $R_4$ represents an alkyl group having 1 to 8 carbon atoms, the proportions of the monomer (A) and the monomer (B) being 75 to 25% by weight and 25 to 75% by weight, respectively, wherein the total amount of the monomers (A) and (B) is 100% by weight, (ii) the content of the rubber-like elastic material in the dispersed phase being 3 to 20 parts by weight based on 100 parts by weight of the styrene resin, (iii) the diameter of dispersed particles of the rubber-like elastic material constituting the dispersed phase being 0.3 to 1.0 μm, (iv) the transmittance of light at 360 nm being not less than 50%.

The Fresnel lens base sheet is preferably an base sheet for a light-diffusive Fresnel lens suitable for the formation of a lens layer of an ultraviolet-cured resin, wherein the rubber-modified styrene resin is preferably a rubber-modified styrene resin composition comprising: 100 parts by weight of the rubber-modified styrene resin; and 0.1 to 5 parts by weight of transparent fine particles which are different in a refractive index difference by ±(0.005 to 0.040) from the rubber-modified styrene resin and have an average particle diameter of 5 to 30 μm.

Further, a lenticular lens and/or a prism and/or a linear Fresnel lens may be provided on at least one side of the Fresnel lens base sheet.

BEST MODE FOR CARRYING OUT THE INVENTION

The present invention will be explained in more detail.

The copolymer constituting the continuous phase comprises 75 to 25% by weight of a styrene monomer (A) and 25 to 75% by weight of an acrylic (methacrylic) ester monomer (B) (the total amount of the styrene monomer and the acrylic (methacrylic) ester monomer being 100% by weight). The amount of the styrene monomer is preferably not less than 40% by weight and less than 60% by weight. When the amount of the styrene monomer is less than 25% by weight, the dimensional stability is poor due to moisture absorption. On the other hands when the amount of the styrene monomer exceeds 75% by weight, the weathering resistance is disadvantageously poor.

The degree of polymerization of the styrene resin constituting the continuous layer is not particularly limited. From the viewpoint of extrudability and the like, however, the degree of polymerization is preferably set so that the rubber-modified styrene resin has an MFR in the range of 0.3 to 5.0 as measured under condition 8 (temperature 200° C./load 5 kgf) according to JIS K 7210. The total amount of the styrene monomer, the acrylic (methacrylic) ester monomer, and the polymerization solvent contained in the rubber-modified styrene resin according to the present invention is preferably not more than 0.10% by weight from the viewpoint of environment at the time of forming of an base sheet. The total amount of origomers, such as dimers and trimers, formed from a styrene monomer and an acrylic (methacrylic) ester monomer is preferably regulated to not more than 0.8% by weight, more preferably not more than 0.6% by weight. A total amount of origomers of more than 0.8% by weight is causative of the contamination of roll at the time of forming of the base sheet. This unfavorably leads to a poor appearance of the base sheet.

In the present invention, styrene, α-methylstyrene, p-methylstyrene, p-t-butylstyrene and the like may be used as the styrene monomer (A). They may be used solely or as a mixture of two or more. In the present invention, methyl methacrylate, ethyl methacrylate, butyl methacrylate, ethyl acrylate, butyl acrylate, and cylohexyl acrylate are suitable as the acrylic (methacrylic) ester monomer (B). In particular, methyl methacrylate alone or a mixture composed of methyl methacrylate and butyl acrylate (and/or butyl methacrylate) is more preferred. When a mixture composed of methyl methacrylate and butyl acrylate (and/or butyl methacrylate) is used, the amount of butyl acrylate (and/or butyl methacrylate) is preferably not more than 20% by weight of the styrene resin as the continuous phase. When the amount of butyl acrylate (and/or butyl methacrylate) exceeds 20% by weight, the heat resistance is deteriorated and, consequently, the service temperature range of the base sheet is disadvantageously narrowed.

The rubber-like elastic material according to the present invention may be any material which has rubber-like properties at room temperature Examples thereof include polybutadiene, styrene-butadiene copolymers, styrene-butadiene block copolymers, hydrogenated (partially hydrogenated) polybutadiene, hydrogenated (partially hydrogenated) styrene-butadiene copolymers, hydrogenated (partially hydrogenated) styrene-butadiene block copolymers, polyisoprene, styrene-isoprene copolymers, styrene-isoprene block copolymers, hydrogenated (partially hydrogenated) polyisoprene, hydrogenated (partially hydrogenated) styrene-isoprene copolymers, hydrogenated (partially hydrogenated) styrene-isoprene block copolymers, ethylene-propylene copolymers, ethylene-propylene-nonconjugated diene terpolymers, and silicone rubbers. In particular, the styrene-butadiene block copolymer is preferred. The reason for this is as follows. Specifically, the styrene content can be set in a wide range. This can realize the formation of rubber-like elastic materials having a wide range of refractive indexes. Therefore, the refractive index can be easily brought to a value identical to the refractive index of the styrene resin as the matrix, and, consequently, a rubber-modified styrene resin having excellent transparency can be prepared.

Since the base sheet should be transparent, the use of a rubber-like elastic material, which is different in refractive index by ±0.03 from the styrene resin constituting the continuous phase, is preferred. The diameter of dispersed particles of the rubber-like elastic material according to the present invention is preferably 0.3 to 1.0 μm, more preferably 0.4 to 1.0 μm. When the diameter of the dispersed particles is less than 0.3 μm, the effect of increasing the impact strength is not developed. When the diameter of the dispersed particles exceeds 1.0 μm, the haze is disadvantageously increased.

The content of the rubber-like elastic material in the rubber-modified styrene resin according to the present invention is 3 to 20 parts by weight, preferably 5 to 15 parts by weight, based on 100 parts by weight of the styrene resin. When the content of the rubber-like elastic material is less than 3 parts by weight, the effect of increasing the impact strength is not developed. On the other hand, when the amount of the rubber-like elastic material exceeds 20 parts by weight, the rigidity is disadvantageously lowered. The form and the like of the dispersed particles of the rubber-like elastic material are not particularly limited. The swelling index of the dispersed particles of the rubber-like elastic material as measured using toluene, which is a measure of the degree of crosslinking of the dispersed particles, is preferably 5 to 20. When the swelling index is outside the above-defined range, the effect of increasing the impact strength is not developed.

The rubber-modified styrene resin according to the present invention should have a light transmittance of not less than 50% at 360 nm. A light transmittance of less than 50% is unsatisfactory for curing the ultraviolet-curable resin for the formation of the Fresnel lens layer.

A method, which has been extensively used in the production of rubber-reinforced polystyrene (HIPS resin), may be used in the production of the rubber-modified styrene resin according to the present invention, specifically, the rubber-like elastic material is dissolved in a stock solution containing a styrene monomer, an acrylic (methacrylic) ester monomer and/or a polymerization solvent and/or a polymerization initiator. The stock solution with the rubber-like elastic material dissolved therein is introduced into a reactor equipped with a stirrer, and polymerization is carried out in the temperature range of 100 to 180° C. The polymerization temperature can be set by a conventional technique while taking into consideration, for example, the productivity, the heat removing capacity of the reactor, and the fluidity of the contemplated rubber-modified styrene resin. The diameter of the dispersed particles may be carried out by a conventional technique, for example, by regulating the rotation speed of the stirrer.

After the completion of the polymerization, the reaction mixture is treated at a high temperature in vacuo to remove the monomers remaining unreacted, the polymerization solvent and the like. Thus, a rubber-modified styrene resin is prepared. In the present invention, the swelling index of the dispersed particles of the rubber-like elastic material can be regulated by the operation temperature after the completion of the polymerization or before, after, or during the removal of the unreacted monomers, the polymerization solvent and the like. Lowering the swelling index can be achieved by raising the operation temperature, while increasing the swelling index can be achieved by lowering the operation temperature.

The transparent fine particles added to the rubber-modified styrene resin according to the present invention are not particularly limited so far as the transparent fine particles have an average particle diameter of 5 to 30 $\mu$m and the difference in refractive index between the transparent fine particles and the rubber-modified styrene resin is ±(0.005 to 0.040). Examples of transparent fine particles include those, which are not melt deformed at the time of melt extrusion of the base sheet, for example, crosslinked or high-molecular weight vinyl aromatic resin particles and crosslinked or high-molecular weight acrylic resin particles. The term "crosslinked resin particles" used herein refers to particles which have a gel fraction of not less than 10% as dissolved in acetone. The term "high-molecular weight resin particles" used herein refers to particles having a weight average molecular weight (Mw) of 500000 to 5000000.

The vinyl aromatic resin particles refer to (1) high-molecular weight resin particles produced by polymerizing a vinyl aromatic monomer, or high-molecular weight resin particles produced by polymerizing a monomer containing not less than 50% by weight of a vinyl aromatic monomer unit and having in its molecule one radically polymerizable double bond, or (2) crosslinked resin particles produced by polymerizing a vinyl aromatic monomer and a monomer having in its molecule at least two radically polymerizable double bonds, or crosslinked resin particles produced by polymerizing a monomer containing not less than 50% by weight of a vinyl aromatic monomer unit and having in its molecule one radically polymerizable double bond and a monomer having in its molecule at least two radically polymerizable double bonds.

Vinyl aromatic monomers include styrene and derivatives thereof. Styrene derivatives include, but are not limited to, halogenated styrenes, such as chlorostyrene and bromostyrene, arid alkyl-substituted styrenes, such as vinyltoluene and a-methylstyrene. The above vinyl aromatic monomers may be used in a combination of two or more.

The monomer having in its molecule one radically polymerizable double bond is not particularly limited so far as the monomer is other than the vinyl aromatic monomer component. Examples thereof include: methacrylic esters, such as methyl methacrylate, ethyl methacnrlate, butyl methacrylate, cyclohexyl methacrylate, phenyl methacrylate, benzyl methacrylate, 2-ethylhexyl methacrylate, and 2-hydroxyethyl methacrylate; acrylic esters, such as methyl acrylate, ethyl acrylate, butyl acrylate, cyclohexyl acrylate, phenyl acrylate, henzyl acrylate, 2-ethylhexyl acrylate, and 2-hydroxyethyl acrylate; and acrylonitrile. Among them, alkyl methacrylates, such as methyl methacrylate, are particularly preferred. Two or more of the above monomers may also be used in combination.

The monomer having in its molecule at least two radically polymerizable double bonds is copolymerizable with the above monomer, and the conjugated diene is excluded from this type of monomer. Examples of monomers having, in the molecule thereof, two radically polymerizable double bonds include: alkyldiol di(meth)acrylates, such as 1,4-butanediol di(meth)acrylate and neopentyl glycol di(meth)acrylate; alkylene glycol di(meth)acrylates, such as ethylene glycol di(meth)acrylate, diethylene glycol di(meth)acrylate, tetraethylene glycol di(meth)acrylate, propylene glycol di(meth)acrylate, tetrapropylene glycol di(meth)acrylate; aromatic polyfunctional compounds, such as divinylbenzene and diallyl phthalate; and (meth)acrylates of polyhydric alcohols, such as trimethylolpropane tri(meth)acrylate and pentaerythritol tetra(meth)acrylate. These monomers may also be used in a combination of two or more.

Acrylic resin particles include (1) high-molecular weight resin particles produced by polymerizing an acrylic monomer, or high-molecular weight resin particles produced by polymerizing a monomer containing not less than 50% by weight of an acrylic monomer unit and having in its molecule one radically polymerizable double bond, or (2) crosslinked resin particles produced by polymerizing an acrylic monomer and a monomer having in its molecule at least two radically polymerizable double bonds, or crosslinked resin particles produced by polymerizing a monomer containing not less than 50% by weight of an acrylic monomer unit and having in its molecule one radically polymerizable double bond and a monomer having in its molecule at least two radically polymerizable double bonds.

Acrylic monomers include methyl methacrylate, ethyl methacrylate, butyl methacrylate, cyclohexyl methacrylate, phenyl methacrylate, benzyl methacrylate, 2-ethylhexyl methacrylate, 2-hydroxyethyl methacrylate, methyl acrylate, ethyl acrylate, butyl acrylate, cyclohexyl acrylate, phenyl acrylate, benzyl acrylate, 2-ethylhexyl acrylate, 2-hydroxyethyl acrylate, methacrylic acid, and acrylic acid. These monomers may also be used in a combination of two or more.

The monomer having in its molecule one radically polymerizable double bond is not particularly limited so far as the monomer is other than the above acrylic monomer component. Examples thereof include styrene and derivatives thereof. Styrene derivatives include halogenated styrenes, such as chlorostyrene and bromostyrene, and alkyl-substituted styrenes, such as vinyltoluene and a-methylstyrene. Among them styrene is particularly preferred. The above monomers may also be used in a combination of two or more.

The monomer having in its molecule at least two radically polymerizable double bonds is copolymerizable with the above monomer, and the conjugated diene is excluded from this type of monomer. This monomer may be properly selected from the above monomers.

Both the vinyl aromatic resin particles and the acrylic resin particles may be produced by polymerizing components of these particles, for example, by suspension polymerization, micro suspension polymerization, emulsion polymerization, or dispersion polymerization.

When the difference in refractive index between the rubber-modified styrene resin and the transparent fine particles is less than (±)0.005, light passed through the base sheet is not sometimes satisfactorily refracted, leading to an enhanced tendency that the incident light as such exits the sheet. When this base sheet is used for a projection television, the diffused image angle is small. Further, in this case, stray light caused by the Fresnel lens is not diffused, and, consequently, the image quality is likely to deteriorate. On the other hand, when the difference in refractive index is more than (±)0.040, the refraction of light within the base sheet is so high that there is a high tendency that the quantity of outgoing light is smaller than the quantity of incident light. That is, in some cases, the total light transmittance is lowered. When this base sheet is used for a projection television, disadvantageously, the brightness of the whole screen is sometimes lowered.

When the average particle diameter of transparent fine particles added to the rubber-modified styrene resin is less than 5 μm, in the case of low fine particle concentration, the quantity of light, which travels at a solid angle in which the direction of straight advance of light is limited, is large. Further, in this case, the light is reddish. As the fine particle concentration is increased, the quantity of the reddish light, which advances straight, is reduced. This abnormal light does not become absent until the peak gain reaches a very low value. This light is an unfavorable light which, when observed with the human's eyes, is recognized as the so-called "lack of hiding." The peak gain is determined as follows. Parallel light is introduced into a flat sheet from behind, and the angle distribution of the luminance of light, which exits the flat sheet forward, is measured. Gains G are then calculated from the illuminance in the flat sheet face and each luminance according to the following equation:

$$G = \text{luminance} \div \text{illuminance} \times \pi$$

The maximum value of the gains is regarded as the peak gain. The maximum gain value is generally obtained in the front of the flat sheet, and the gain value gradually decreases with increasing the angle of the flat sheet to the normal.

On the other hand, when the average particle diameter of transparent fine particles exceeds 30 μm, the concentration of the fine particles used becomes excessively large. This is disadvantageous from the viewpoints of economy and production techniques. Further, in this case, as compared with the particle diameter falling within the particle diameter range specified in the present invention, the half value angle is unfavorably smaller. The half value angle refers to an angle at which the gain is the half of the peak gain.

The transparent fine particles are added in an amount of 0.1 to 5.0 parts by weight based on 100 parts by weight of the rubber-modified styrene resin. When the amount of the transparent fine particles added is less than 0.1 part by weight, the diffusion image angle is small. Further, in this case, stray light caused by the Fresnel lens is not diffused, and, consequently, the image quality is likely to deteriorate. Furthermore, in the case of a single light source such as a projector using a light valve, glare of images called "scintillation" occurs. Therefore, when an image on the screen is viewed from the viewer side, this makes it impossible to reduce a defect such as low visibility of image screen. On the other hand, when the amount of the transparent fine particles added exceeds 5.0 pares by weight, the total light transmittance is sometimes lowered. When this base sheet is used for a projection television, disadvantageously, the brightness of the whole screen is sometimes lowered.

Additives commonly used in styrene resins, for example, antioxidants, lubricants, and plasticizers, may be incorporated into the rubber-modified styrene resin used in the present invention so far as the features of the Fresnel base sheet according to the present invention are not sacrificed.

The Fresnel base sheet is produced by conventional melt extrusion. The Fresnel base sheet in its surface on image light incident side is preferably in a fine concave/convex form. The concave/convex form is particularly preferably a lens element having a substantially elliptic shape in a horizontal section. The provision of a lenticular lens, a prism, and a linear Fresnel lens on at least one side of the Fresnel lens base sheet can prevent a deterioration in stray light-derived image quality called "rainbow." In this case, when the lenticular lens is used, the diffusion image angle can be increased, leading to improved evenness of brightness of the screen, and, when the prism or the linear Fresnel lens is used, the optical axis can be varied according to the position of the viewer to realize excellent image quality. The Fresnel base sheet preferably is in a specific warpage form.

For example, in an base sheet having a size of 1468 mm in extrusion direction and 1106 mm in width direction, the warpage level in the extrusion direction is 25±5 mm (measuring method: the sheet is suspended at positions of one-third and two-third of one long side, and the warpage level in cross direction is measured), and the warpage level in width direction is 5±5 mm (measuring method: the sheet is suspended at positions of one-third and two-third of one short side, and the warpage level in cross direction is measured). In order to prepare an base sheet having a specific warpage shape, extrusion conditions, such as extrusion temperature, extrusion rate, and polishing roll temperature, should be optimized.

If necessary, an antistatic agent may be applied to the extruded base sheet in its surface on image light incident side from the viewpoint of preventing the adhesion of dirt.

A Fresnel lens sheet can be prepared by coating a predetermined amount of a liquid ultraviolet-curable resin on a Fresnel lens mold, placing a Fresnel base sheet on the coating, pressing roll against the assembly, applying ultraviolet light to the assembly from a metal halide lamp in an ultraviolet light source devices, and then separating a Fresnel lens sheet with a lens element formed thereon from the Fresnel lens mold.

EXAMPLES

The following examples and comparative examples further illustrate the present invention, but are not intend to limit it.

Testing methods used in the examples and comparative examples of the present invention will be described.
(i) Rubber Particle Diameter:
The rubber particle diameter was measured with a Coulter counter of the following type manufactured by Coulter Corporation.
Body: Model MULTISIZER II
Measuring apparatus: Model MULTISIZER IIE
The volume average 50% median diameter was determined using an electrolytic solution composed of dimethylformamide and ammonium thiocyanate.
(ii) Light Transmittance:
The light transmittance was measured at 360 nm with a Shimadzu autographic spctrophotometer UV-3100 PC (manufactured by Shimadzu Seisakusho Ltd.).
(iii) Refractive Index:
The refractive index was measured with an ATAGO precision Abbe's refractometer (Model III, manufactured by Atago Co., Ltd.).
(iv) MFR;
MPR was measured under condition 8 (temperature 200° C./load 5 kgf) according to JIS K 7210.

(v) Swelling Index:

1 g of a rubber-modified styrene resin was dissolved in 20 cc of toluene to prepare a solution, and the solution was centrifuged to separate insolubles which were then weighed. The weight of the insolubles separated by the centrifugation was designated as (G1). The insolubles were dried and were then weighed, and the weight of the dried insolubles was designated as (G2). The G1/G2 ratio was then determined.

(vi) Gel Fraction of Crosslinked Resin Particles:

The insoluble fraction was measured by Soxhlet's method using acetone as a solvent.

(vii) Lightfastness:

YI was measured with a sunshine weather-o-meter (manufactured by Suga Test Instruments Co., Ltd.) before and after exposure under conditions of 63° C./no spray for 200 hr to determine AYI. YI was measured according to JIS K 7105 with a Model TC-1800 automatic color analyzer manufactured by Tokyo Denshoku Co., Ltd. using a C light source.

(viii) Impact Resistance:

A Fresnel lens was shaped on an base sheet, find the Fresnel lens was then inspected for cracking upon the separation of the Fresnel lens from a mold and for cracking of the Fresnesl lens upon cutting of the periphery of the Fresnel lens sheet with a guillotine cutter.

(ix) Environmental Resistance:

A screen set comprising a combination of a Fresnel lens sheet with a lenticular lens sheet was set in a frame of a projection television having a size of 60 in., was exposed under conditions of 40° C. and 90% RH for 168 hr, and was then allowed to stand at room temperature for 7 days. The difference in warpage level between before and after the test and the difference in lift level between before and after the test were measured.

Example 1

(Rubber-Modified Styrene Resin-A)

A rubber-modified styrene resin was produced using a polymerizer comprising two reactors equipped with a stirrer connected in series and a twin-screw extruder with a two-stage vent provided behind the reactors.

In this case, a stock solution containing [A] 46 parts by weight of styrene, [B] 38.5 parts by weight of methyl methacrylate, [C] 6 parts by weight of butyl acrylate, 9.5 parts by weight of a rubber-like elastic material [rubber-like elastic material=a B-S type block copolymer (B: butadiene block, S: styrene block), styrene content 35% by weight], 2.8 parts by weight of ethylbenzene, and 0.01 part by weight of 1,1-bis(t-butylperoxy) cyclohexane was fed to the polymerization reactor to conduct polymerization. The polymerization was carried out at a polymerization temperature of 130° C. for the first-stage reactor and 150° C. for the second-stage reactor until the solid content of the reaction solution reached 80% by weight. The polymer solution was lead to the twin-screw extruder with a two-stage vent, and the monomers remaining unreacted and the polymerization solvent were removed under conditions of 240° C. and 10 mmHg to prepare a rubber-modified styrene resin-A containing 13 parts by weight of a rubber-like elastic material. The diameter of dispersed particles of the rubber-like elastic material in the rubber-modified styrene resin-A was 0.6 μm. The rubber-modified styrene resin-A had a light transmittance of 84% at 360 nm, a refractive index of 1.546, an MFR of 2.8 g/10 min, and a swelling index of 11.1.

(Transparent Fine Particles-A)

40 parts by weight of methyl methacrylate, 20 parts by weight of n-butyl methacrylate, 20 parts by weight of styrene, and 20 parts by weight of divinylbenzene were charged into a glass reaction vessel equipped with a nitrogen gas inlet tube, a thermometer, and a condenser and were mixed together, and 1.5 parts by weight of benzoyl peroxide was then added to the mixture to prepare a solution.

Separately, 2 parts by weight of polyvinyl alcohol was added to 300 parts by weight of ion-exchanged water to prepare a solution. This solution was added to the above glass reaction vessel, and the mixture was stirred to prepare a dispersion. After the introduction of nitrogen gas, the dispersion was heated to 80° C. with stirring.

This temperature was held for 8 hr, and the resultant suspension was then cooled to room temperature and was filtered to separate polymer particles from the aqueous polyvinyl alcohol solution as the dispersion medium. The polymer particles thus obtained were redispersed in 100 parts by weight of methyl alcohol, and the dispersion was stirred for one hr and was then filtered to separate polymer particles. The collected polymer particles were dried in a drier kept at 80° C. for 8 hr and were then disintegrated.

The polymer particles thus obtained were air classified to prepare transparent fine particles-A having an average particle diameter of 20 μm. The fine particles had a gel fraction of 98% and a refractive index of 1.532.

100 parts by weight of the rubber-modified styrene resin-A was mixed with 0.5 part by weight of the transparent fine particles-A, and the mixture was extruded through a twin-screw extruder to prepare a composition for a Fresnel base sheet. The composition was melt extruded through an extruder at a temperature of 220° C. and was passed through a 1200 mm-width T die lip to form a sheet which was then sandwiched between a roll having a diameter of 350 mm (set temp.: 60° C.) and a polishing roll having a diameter of 350 mm (set temp.: 60° C.) to continuously form a Fresnel base sheet having a thickness of 1.8 mm and a width of 1200 mm.

Separately, an ultraviolet-curable resin was floated on a Fresnel lens mold, and the Fresnel base sheet was adhered onto the ultraviolet-curable resin coating. Ultraviolet light was applied to the assembly to cure the coating, and the Fresnel lens was separated from the mold. The lightfastness of the base sheet and the impact resistance and environmental resistance of the Fresnel lens were measured, and the results thereof are shown in Table 1.

Example 2

A Fresnel base sheet was molded in the same manner as in Example 1, except that the surface of the roll was in a lenticular form of R (radius)=0.4 mm and pitch=0.1 mm. Next, a Fresnel lens was prepared in the same manner as in Example 1, except that the Fresnel base sheet prepared just above was used. The impact resistance and the environmental resistance of the Fresnel lens were excellent and comparable to those of the Fresnel lens prepared in Example 1. Further, when a television image was projected, the rainbow was weak, the screen was evenly bright, and the image quality was excellent.

Example 3

A Fresnel base sheet was molded in the same manner as in Example 1, except that a prism of pitch=0.3 mm and prism angle=10 degrees was provided on the surface of the roll. Next, a Fresnel lens was prepared in the same manner as in Example 1, except that the Fresnel base sheet prepared just above was used. The impact resistance and the environmental resistance of the Fresnel lens were excellent and comparable to those of the Fresnel lens prepared in Example 1. Further, when a television image was projected, the rainbow was weak, the screen was bright even as viewed from above the screen, and the image quality was excellent.

Example 4

A Fresnel base sheet was molded in the same manner as in Example 1, except that a roll was used wherein a linear Fresnel with a pitch of 0.3 μm and a focal length of 30 m was provided on the surface of the roll so that the center of the liner Fresnel was the end face of the roll. Next, a Fresnel lens was prepared in the same manner as in Example 1, except that the Fresnel base sheet prepared just above was used. The impact resistance and the environmental resistance of the Fresnel lens were excellent and comparable to those of the Fresnel lens prepared in Example 1. Further, when a television image was projected, the rainbow was weak, the screen was uniformly bright even as viewed from above the screen, and the image quality was excellent.

Comparative Example 1

(Rubber-Modified Styrene Resin-B)

A rubber-modified styrene resin-B was prepared in the same manner as in Example 1, except that [A] 76 parts by weight of styrene, [B] 11.5 parts by weight of methyl methacrylate, [C] 3 parts by weight of butyl acrylate, and 9.5 parts by weight of a rubber-like elastic material were used. The diameter of dispersed particles of the rubber-like elastic material in the rubber-modified styrene resin-B was 0.58 μm. The rubber-modified styrene resin-B had a light transmittance of 82% at 360 nm, a refractive index of 1.571, an MFR of 2.6 g/10 min, and a swelling index of 10.3.

The procedure of Example 1 was repeated, except that the rubber-modified styrene resin-B was used. Thus, a Fresnel base sheet and a Fresnel lens were prepared.

The lightfastness of the base sheet and the impact resistance and the environmental resistance of the Fresnel lens were measured in the same manner as in Example 1. The results are shown in Table 1. As is apparent from Table 1, the base sheet had poor lightfastness and thus was not put to practical use Comparative Example 2

(Rubber-Modified Styrene Resin-C)

A rubber-modified styrene resin-C was prepared in the same manner as in Example 1, except that [A] 14.5 parts by weight of styrene, [B] 70 parts by weight of methyl methacrylate, [C] 6 parts by weight of butyl acrylate, and 9.5 parts by weight of a rubber-like elastic material were used. The diameter of dispersed particles of the rubber-like elastic material in the rubber-modified styrene resin-C was 0.58 μm. The rubber-modified styrene resin-C had a light transmittance of 85% at 360 nm, a refractive index of 1.507, an MFR of 2.0 g/10 min, and a swelling index of 11.5.

The procedure of Example 1 was repeated, except that the rubber-modified styrene resin-C was used. Thus, a Fresnel base sheet and a Fresnel lens were prepared.

The lightfastness of the base sheet and the impact resistance and the environmental resistance of the Fresnel lens were measured in the same manner as in Example 1. The results are shown in Table 1. As is apparent from Table 1, the Fresnel lens had poor environmental resistance and thus was not put to practical use.

Comparative Example 3

(Rubber-Unmodified Styrene Resin-D)

A rubber-unmodified styrene resin-D was prepared in the same manner as in Example 1, except that [A] 46 parts by weight of styrene, [B] 38.5 parts by weight of methyl methacrylate, and [C] 6 parts by weight of butyl acrylate were used. The rubber-unmodified styrene resin-D had a light transmittance of 86% at 360 nm, a refractive index of 1.542, and an MFR of 2.7 g/10 min. A Fresnel base sheet was prepared in the same manner as in Example 1, except that the rubber-unmodified styrene resin-D prepared just above was used. Next, when an ultraviolet-curable resin was cured for the production of a Fresnel lens followed by the separation of the Fresnel lens from the mold, the Fresnel lens was cracked. Therefore, the environmental resistance could not be evaluated. The lightfastness of the base sheet and the impact resistance of the Fresnel lens were measured in the same manner as in Example 1 The results are shown in Table 1. As is apparent from Table 1, the Fresnel lens had poor impact resistance and thus was not put to practical use.

Comparative Example 4

A rubber-modified styrene resin composition was prepared in the same manner as in Example 1, except that 0.01 part by weight of an ultraviolet absorber (Tinuvin P, manufactured by Ciba Specialty Chemicals, K. K.) was added. An base sheet was prepared in the same manner as in Example 1, except that the rubber-modified styrene resin composition prepared just above was used. The base sheet had a light transmittance of 10% at 360 nm. An attempt has been made to produce a Fresnel lens in the same manner as in Example 1 except that the base sheet prepared just above was used. As a result, the ultraviolet-curable resin was not cured making it impossible to prepare a Fresnel lens.

Comparative Examples 5 and 6

A rubber-modified styrene resin-E was prepared in the same manner as in Example 1, except that the stirring speed of the stirrer in the reactor was made higher than that of the stirrer in the reactor in Example 1. Further, a rubber-modified styrene resin-F was prepared in the same manner as in Example 1, except that the stirring speed of the stirrer in the reactor was made lower than that of the stirrer in the reactor in Example 1.

The diameter of dispersed particles of the rubber-like elastic material in the rubber-modified styrene resin-E was 0.25 μm, and the other properties of the rubber-modified styrene resin-E were substantially the same as those of the rubber-modified styrene resin-A.

The diameter of dispersed particles of the rubber-like elastic material in the rubber-modified styrene resin-F was 2.0 μm, and the other properties of the rubber-modified styrene resin-F were substantially the same as those of the rubber-modified styrene resin-A.

A Fresnel base sheet was prepared in the same manner as in Example 1, except that the rubber-modified styrene resin-E prepared just above was used. Next, when an ultraviolet-curable resin was cured for the production of a Fresnel lens followed by the separation of the Fresnel lens from the mold, the Fresnel lens was cracked.

On the other hand, an base sheet prepared from the rubber-modified styrene resin-F had a large haze and thus could not be put to practical use as a Fresnel lens base sheet.

TABLE 1

|  |  | Ex. 1 | Comp. Ex. 1 | Comp. Ex. 2 | Comp. Ex. 3 |
|---|---|---|---|---|---|
| Light fastness | ΔYI | 3 | 6 | 2 | 3 |
| Impact resistance | Cracking at the time of separation | Not cracked | Not cracked | Not cracked | Cracked |
|  | Cracking at the time of cutting | Not cracked | Not cracked | Not cracked | * |
| Environmental resistance | Change in warpage level, mm | 0 | 0 | 5 | * |
|  | Change in lift level, mm | 0 | 0 | 2 | * |

*: Immeasurable because any Fresnel lens could not be prepared.

As described above, according to the present invention, a Fresnel base sheet is provided which is suitable for the formation of a lens layer of an ultraviolet-cured resin and has excellent impact resistance and environmental resistance. The Fresnel base sheet comprises a specific rubber-modified styrene resin comprising a rubber-like elastic material as dispersed particles and a copolymer of a styrene monomer with an acrylic (methacrylic) ester monomer as a continuous phase.

What is claimed is:

1. An extruded base sheet for a Fresnel lens suitable for the formation of a lens layer of an ultraviolet-cured resin, said base sheet being formed of a rubber-modified resin comprising an elastic material as dispersed particles and a resin as a continuous phase, (i) the resin constituting the continuous phase being a copolymer of a monomer (A) represented by formula (1)

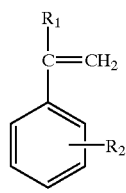

(1)

wherein $R_1$ represents hydrogen or a methyl group; and $R_2$ represents hydrogen or an alkyl group having 1 to 5 carbon atoms,
with an acrylic (methacrylic) ester monomer (B) represented by formula (2)

(2)

wherein $R_3$ represents hydrogen or a methyl group; and $R_4$ represents an alkyl group having 1 to 8 carbon atoms, the proportions of the monomer (A) and the monomer (B) being 75 to 25% by weight and 25 to 75% by weight, respectively, wherein the total amount of the monomers (A) and (B) is 100% by weight, (ii) the content of the elastic material in the dispersed phase being 3 to 20 parts by weight based on 100 parts by weight of the rubber modified resin, (iii) the diameter of dispersed particles of the elastic material constituting the dispersed phase being 0.3 to 1.0 μm, and (iv) the transmittance of light at 360 nm being not less than 50%, wherein the rubber-modified resin is a rubber-modified resin composition comprising: 100 parts by weight of the rubber-modified resin; and 0.1 to 5 parts by weight of transparent fine particles that are different in a refractive index difference by ± (0.005 to 0.040) from the rubber-modified resin and have an average particle diameter of 5 to 30 μm.

2. The extruded base sheet according to claim 1, wherein a lenticular lens and/or a prism and/or a linear Fresnel lens have been provided on at least one side of the base sheet.

3. A Fresnel lens produced by using the extruded base sheet according to claim 1.

* * * * *